United States Patent
Hager

Patent Number: 6,025,800
Date of Patent: Feb. 15, 2000

[54] INTERFEROMERIC SYNTHETIC APERTURE RADAR ALTIMETER

[75] Inventor: James R. Hager, Golden Valley, Minn.

[73] Assignee: Honeywell Inc., Minneapolis, Minn.

[21] Appl. No.: 09/165,624

[22] Filed: Oct. 2, 1998

[51] Int. Cl.⁷ .................................................. G01S 3/02
[52] U.S. Cl. .......................... 342/450; 342/25; 342/463; 342/457
[58] Field of Search ........................... 342/25, 450, 457, 342/462, 465, 463

[56] References Cited

U.S. PATENT DOCUMENTS

| | | | |
|---|---|---|---|
| 3,735,400 | 5/1973 | Sletten et al. | 343/7.7 |
| 4,386,355 | 5/1983 | Drew et al. | 343/112 D |
| 5,051,749 | 9/1991 | Stoyle | 342/25 |
| 5,126,748 | 6/1992 | Ames et al. | 342/353 |
| 5,185,608 | 2/1993 | Pozgay | 342/17 |
| 5,260,708 | 11/1993 | Auterman | 342/25 |
| 5,828,332 | 10/1998 | Frederick | 342/26 |

*Primary Examiner*—Thomas H. Tarcza
*Assistant Examiner*—Dao L. Phan
*Attorney, Agent, or Firm*—Albert K. Kau

[57] ABSTRACT

Aircraft position determination system includes a transmitter to transmit a signal, and two receivers to receive the transmitted signal reflected from the terrain below the aircraft, and a phase comparison apparatus operating from the two receiver's inputs. A processor determines position based on the output from the phase comparison apparatus.

14 Claims, 5 Drawing Sheets

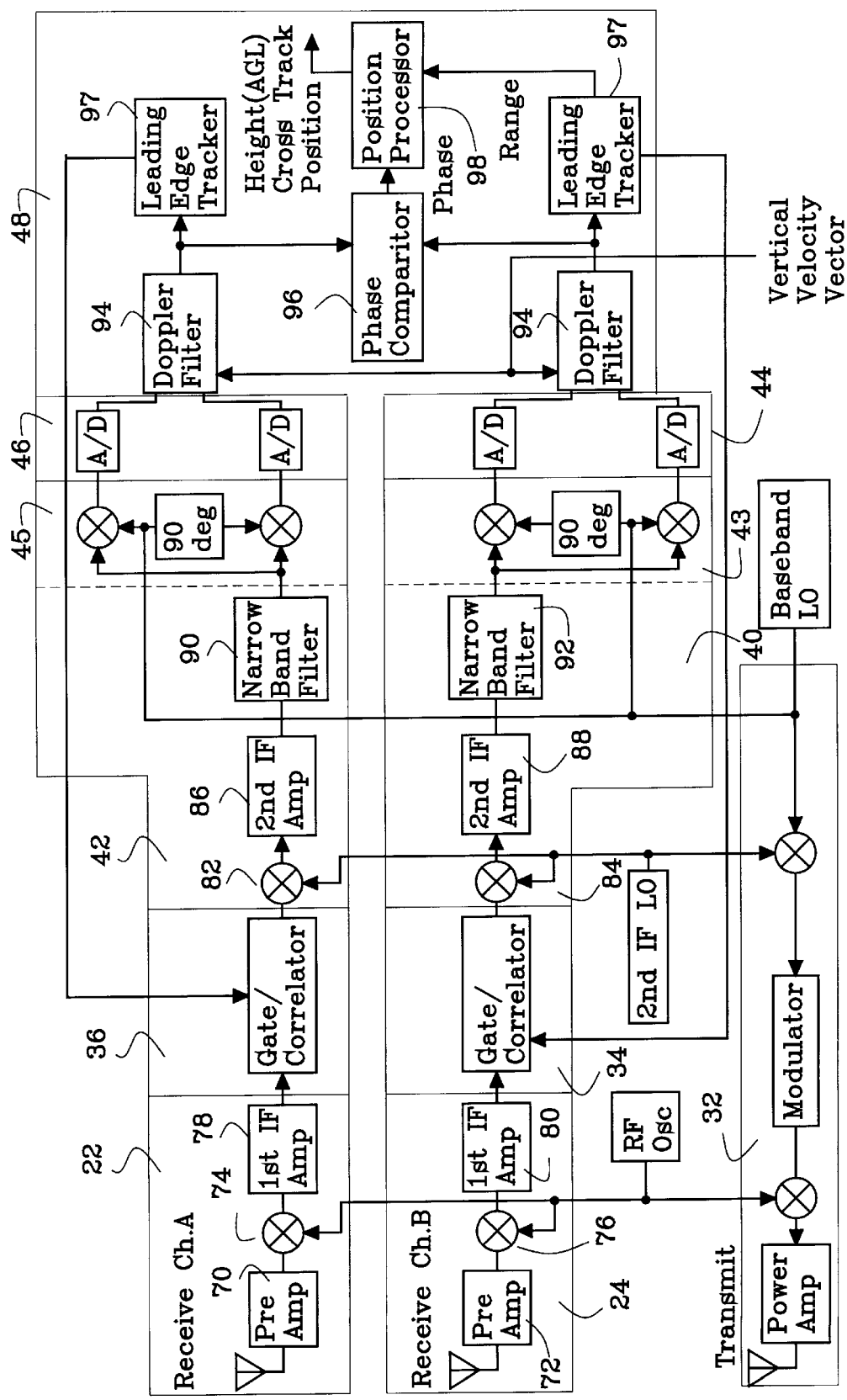

INTERFEROMERIC SYNTHETIC APERTURE RADAR ALTIMETER

BACKGROUND OF THE INVENTION

The proper navigation of an aircraft in all phases of its flight is based to a large extent upon the ability to determine the terrain and position over which an aircraft is passing. In this regard, instrumentation, such as radar systems, and altimeters in combination with the use of accurate electronic terrain maps, which provide the height of objects on a map, aid in the flight path of the aircraft. Electronic terrain maps are well known in this area of technology and no further discussion in the creation of electronic terrain maps will discussed. Presently, electronic terrain maps are used to assist in the navigation of aircraft.

FIG. 1 shows an aircraft 2 with the Doppler effect illustrated by isodops as a result of selection by the use of Doppler filters. The area between the isodops of the Doppler configuration will be referred to as swaths. The Doppler filter, and resulting isodops are well known in this area of technology and will not be explained in any further detail. Further, the aircraft 2 in the specification will be assumed to have a vertical velocity of zero. As is known, if a vertical velocity exists, the median 8 of the Doppler effect will shift depending on the vertical velocity. If the aircraft 2 has a vertical velocity in a downward direction, the median of the Doppler would shift to the right of the figure. If the aircraft 2 has a vertical velocity in an upward direction, the Doppler would shift to the left of the figure. Again, it will be assumed in the entirety of the specification that the vertical velocity is zero for the ease of description. However, it is known that a vertical velocity almost always exists.

Radar illuminates a ground patch bounded by the antenna beam 10 from an aircraft 2. FIG. 1a shows a top view of the beam 10 along with the Doppler effect and FIG. 1b shows the transmission of the beam 10 from a side view. To scan a particular area, range gates are used to further partition the swath created by the Doppler filter. To scan a certain Doppler swath, many radar range gates operate in parallel. With the range to each partitioned area determined, a record is generated representing the contour of the terrain below the flight path. The electronic maps are used with the contour recording to determine the aircraft's position on the electronic map. This system is extremely complex with all the components involved as well as the number of multiple range gates that are required to cover a terrain area. As a result, the computations required for this system are very extensive.

In addition to the complexity, the precision and accuracy of the distance to a particular ground area or object has never been attained. As is well known in this area, a larger antenna would result in a greater accuracy. For satellites and larger vehicles, a larger antenna could be used and precise, accurate determination of position could be performed. However, for aircraft and other smaller flying apparatus such as missiles for example, it would be infeasible to use a large antenna. It would be desirable and beneficial if a smaller, precise navigational means could be used. Furthermore, it would be desirable and beneficial if a less complex system for determining the position of an aircraft existed.

SUMMARY OF THE INVENTION

An aircraft position determination system includes a transmitter and two receiver channels. The transmitter transmits a signal, and a first receiver channel with its Doppler filter selects the next swath ahead for range determination of the highest object and at the same time, a second receiver channel with its Doppler filter selects the swath directly below the aircraft for exact positioning of the highest object. During the last portion of the present invention's operation time interval, both channels select the swath directly below the aircraft and set a range gate to the exact range position of the highest object and a phase comparison of the signal return made between the two channels is performed. This information is used to determine the aircraft position.

BRIEF DESCRIPTION OF THE DRAWINGS

FIG. 5 shows a more detailed implementation of the present invention.

DETAILED DESCRIPTION OF THE PRESENT INVENTION

The present invention provides a smaller, more accurate navigation means than existing navigation means. The present invention uses topographic/elevation mapping as described in the background of the invention along with the present invention for precision navigation. Not only is the present invention more precise and smaller, but also less complex. As a result of fewer components, the present invention will be far less expensive as well. The present invention functions as a combination Doppler radar/interferometer to navigate an aircraft 2 with respect to terrain features below the aircraft 2. The present invention also functions with the use of an electronic map, as described in the background of the invention, in determining the position of the aircraft 2. In addition to determining the altitude of the aircraft 2, the height of the highest object above the ground and the XYZ location of the highest object with respect to the aircraft 2 in a certain terrain area can be determined.

Figure 1A:
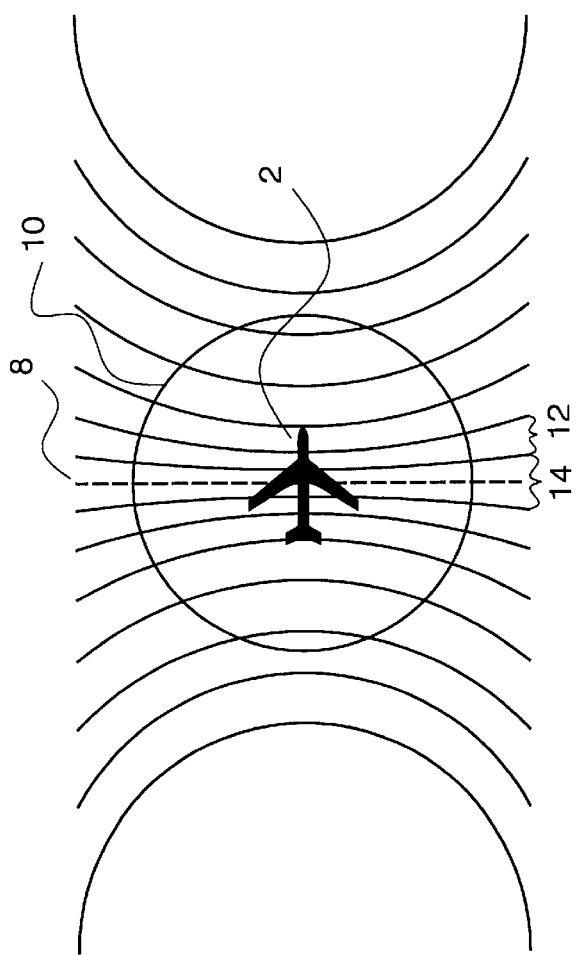
FIG. 1a shows a top view of the aircraft illustrating isodops corresponding to the Doppler filter bounds as well as a beam area transmitted by a transmit antenna on the aircraft.
Figure 1B:
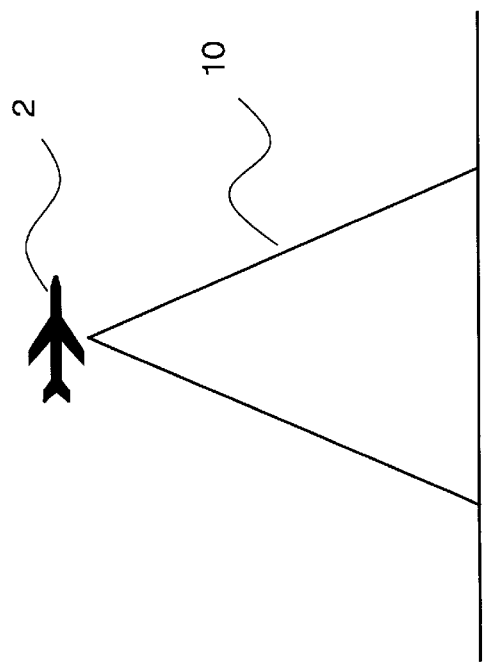
FIG. 1b shows a side view of the aircraft and the beam transmitted from the transmit antenna from the aircraft to the ground.
Figure 3:
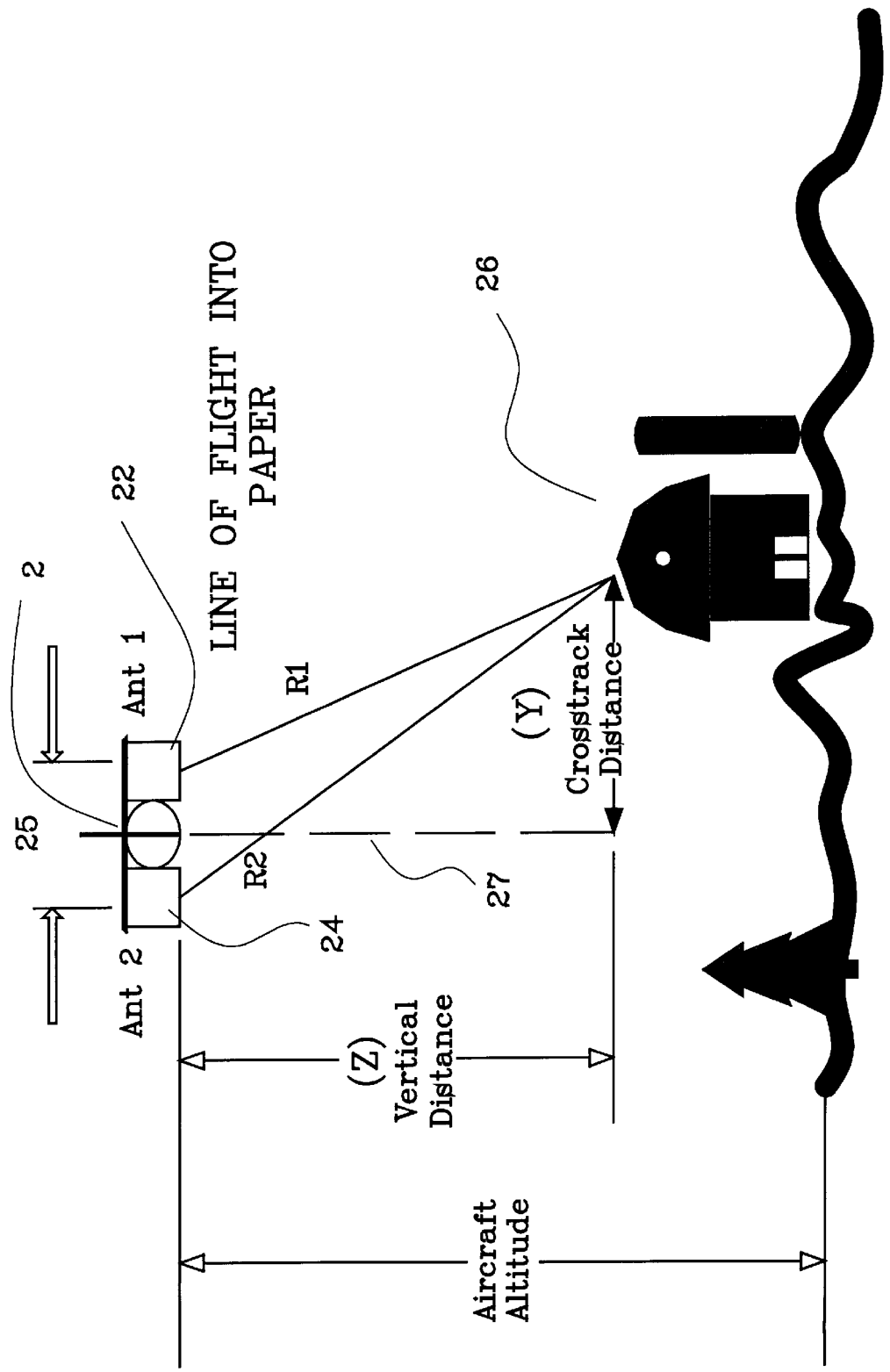
FIG. 3 shows a view of an aircraft going into the figure with two receive antennas receiving reflected signals off an object originally transmitted by the transmit antenna.

As an aircraft 2 is flying over terrain as shown in FIGS. 1a, 1b, and 3 it is important to determine the position of the aircraft 2 in accordance with a map. The present invention uses a Doppler filter and range gate with a transmitted beam 10 from a transmit antenna. Two receive antennas, Antenna 1 22 and Antenna 2 24, are used in the present invention to receive information. Along with the two antennas, two channels, Channel 1 and Channel 2 for Antenna 1 22 and Antenna 2 24 respectively, are used to perform operations in determining the position of the aircraft 2. Each channel includes an antenna, gate, Doppler filter and a tracker.

The first antenna, Antenna 1 22 of Channel 1, along with a high speed tracker 97a will provide a course range search which roughly determines the range to the highest point 26 in the swath 12 before the swath 14 the aircraft 2 is currently over. Determination of the highest point 26 is performed by a wide bandwidth, hi speed track loop (provided by the tracker 97a) which quickly determines the range to the highest object 26 in the swath area 12 thus providing a starting point for Channel 2's track loop. Track loops are well known in this area of technology and control the range gate to track returns from the transmit antenna. A narrow bandwidth, high precision tracker 97b is used to set Channel 2's range gate 36 to the exact range of the highest point 26 based on Channel 1's previous course range determination since it is always one swath ahead of Channel 2. The operation of the two receive antennas and associated channels provides a quick and accurate setting of a range gate on the nearest object in the Doppler swath 14 directly below the aircraft 2 so that a phase difference can be measured and along with the known separation 25 between the two antennas, the crosstrack distance to the object 26 is determined. The crosstrack distance is the distance, horizontal and perpendicular to the line of flight, directly below the aircraft 2 to the object 26. Crosstracks are well known in this area of technology. Further, radar range trackers are well known in this area of technology and a description of their operation will not be discussed here.

Figure 2:
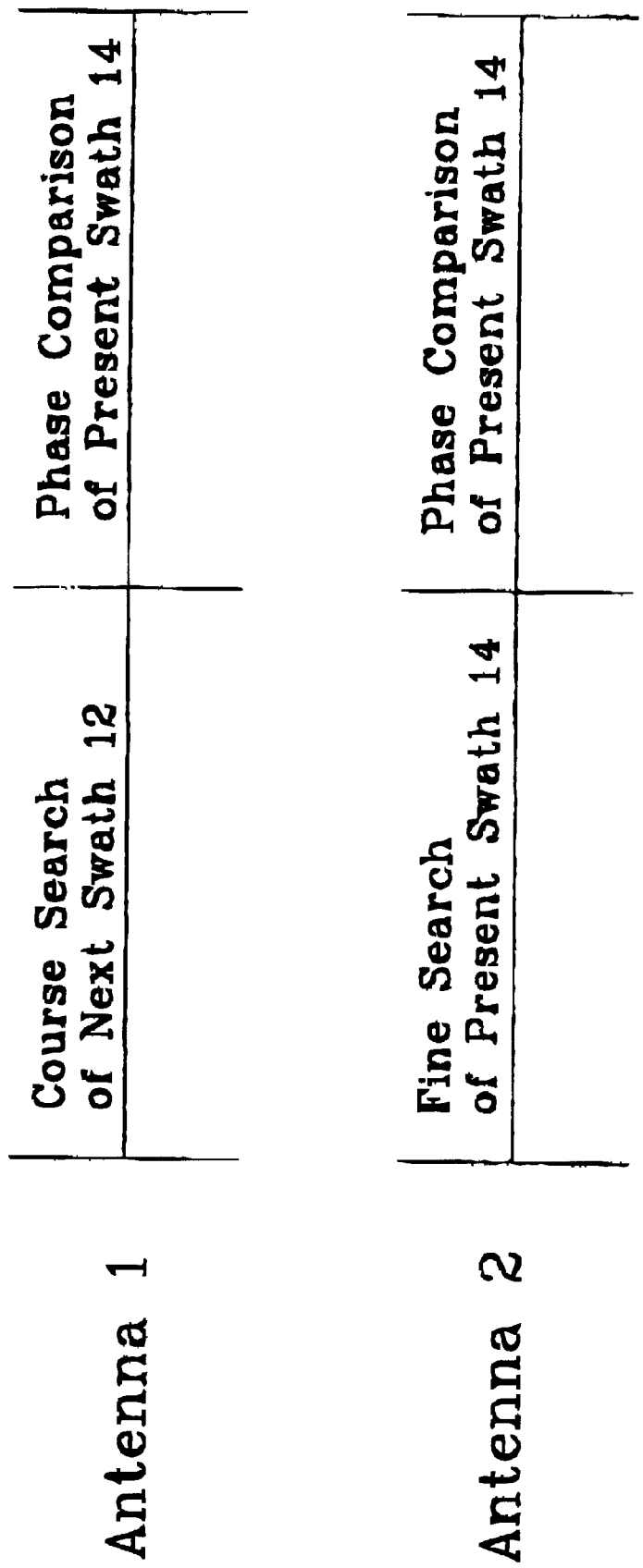
FIG. 2 shows a timing sequence of the operation for the present invention.

FIG. 2 shows the timing of the operation of the present invention which is crucial to the invention. Antenna 1 22 and a high speed track loop determine the range to the highest point in swath 12 selected by the Channel 1 Doppler filter 94a. Channel 2, at the same time that Channel 1 is receiving information from swath 12, receives information on range of the highest point 26 in swath 14. The information received by Channel 1 of swath 12 is saved in memory for the next time period. Once Channel 2 has received the course range from Channel 1 (determined in the previous time interval) and accurately sets its range gate to the range to the object 26, the rest of the period is spent in comparing the phase difference between R1 and R2 of swath 14 where R1 and R2 are the current distances from the respective antennas, Antenna 1 22 and Antenna 2 24 to the highest object 26. As can be seen, approximately half the period is spent accurately setting the gates to the highest object in a swath and the other half of the time period is spent comparing the phase difference.

FIG. 3 shows a view with the aircraft 2 coming out of the figure. As stated previously, during the phase comparison portion of the time interval, the Doppler filters of both Channel 1 and Channel 2 are set to select the swath 14 directly below the aircraft 2 and further, both range gates are set at a range directly on the highest object 26 as determined during the first portion of the time interval by Channel 2. For example, during the first interval, Channel 1 will determine the range of the highest object 26 in swath 12 to be approximately 4,050 feet away. This is stored in memory so when the first interval of the next time interval occurs, Channel 2 will set the range gate at 4,050 feet in swath 14, which was the swath ahead in the previous time interval, and more accurately determine the range. Since Channel 2 uses a more accurate tracker 94b, it may determine that the actual range of the aircraft 2 to the highest object 26 is 4,000 feet. Then, in the second interval of the time interval, the range gates of both channels are set to a range of 4,000 feet. From this range, Antenna 1 22 receives a signal from the object 26 at a distance of R1 and Antenna 2 24 receives the signal from the same object 26 at a distance of R2 where the distance difference is a function of the antenna separation 25. A phase comparitor 96 compares the phase difference between R1 and R2 once the return signals are received. Phase comparitors are well known in this area of technology and its operation will not be discussed in any further detail here. As FIG. 3 illustrates, the exact range difference (R2–R1) is from the phase difference and simple trigonometry relations are used to determine the exact crosstrack distance to the object 26.

As FIG. 3 illustrates, after the range difference (R2–R1) is determined and knowing the antenna separation 25, and measured range R1, then the crosstrack distance (Y) and vertical distance (Z) can also be computed. It is important that the height (above ground) and precise location (with respect to the point on the ground directly below the aircraft) of the highest object 26 in each swath is determined so correlation can be made with the electronic maps which will accurately locate the aircraft 2 on the electronic map. For example, at typical high speed aircraft cruising velocities, millimeter wavelength radar, and with reasonably sized Doppler filters, the swath widths are less than 10 feet at 5000 feet altitude. Typically the beam will be about 6 degrees. The resulting incidence angle formed by the intersection of R1 and a vertical line 27 will then be on the order of less than 3 degrees. Basic trigonometry relations show that even with a typical error (for example 1%) on the radar range gate measured distance R1, (50 feet at 5000 feet altitude), knowing the precise antenna separation 25, and precise range difference (R2–R1), the crosstrack distance (Y) will be precise due to the very small incidence angle encountered.

Altitude is computed by an algorithm which for example measures R1 when it has been determined there are no objects in a particular swath. For example, When the crosstrack distance computes to 0 feet continuously for many Doppler swaths and without abrupt range changes, then the system is tracking the ground directly below the aircraft 2 and further, there are no objects of significant height in its path. An algorithm can obviously be provided then to determine aircraft altitude from the normal operation of this system. The height of the object with respect to surrounding terrain can then be computed by subtracting the vertical distance (Z) to the object, calculated by simple trigonometry relations, from the aircraft altitude. Further, the processor also determines the aircraft's position according to the electronic map.

Figure 4:
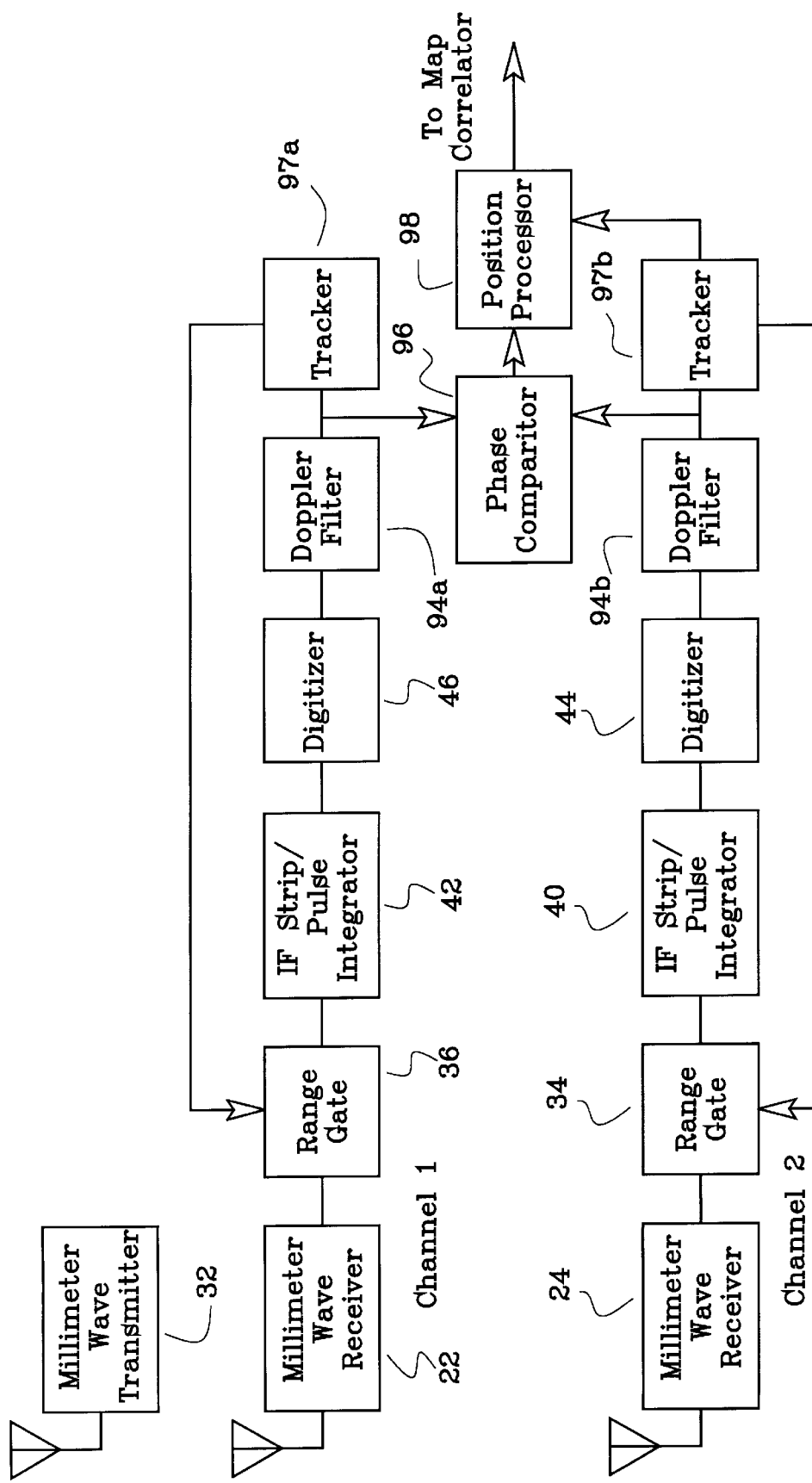
FIG. 4 shows a block diagram of the present invention.

FIG. 4 shows a block diagram of an embodiment of the system of the present invention. A transmitter 32 transmits the beam 10 signal. A first receiver 22 receives a return signal in swath 12. A second receiver 24 receives a return signal in swath 14. After passing through gate/correlators and IF strips, the received information is converted to digital data to be processed. A Doppler filter 44 and 46 passes only information from the desired swath and the range gate and tracker are used to develop a track loop to pass information only from the range corresponding to the highest object 26. A phase comparitor 96 performs the a phase comparison of the return signal of the highest object 26 and a processor 98 uses this information to determine the altitude and position. After the position is determined, a map match processor correlates the information and determines the aircraft's location according to the map. Therefore, if the aircraft 2 is not on course to its destination according to the map, correction can be provided to maintain the correct course.

FIG. 5 provides a more detailed view of the present invention. The transmitter 32 sends the signal to the terrain. The transmitter configuration is well known in this area of technology and will not be discussed further. The first and second receivers 22 and 24 have similar configurations and the first receiver will be described in which the description is applicable to the second receiver as well. The receiver 22 receives the signal reflected back from the terrain. A preamplifier 70 amplifies the signal. A mixer 74 converts the signal to a first intermediate frequency (IF) where the signal is then amplified again by a first amplifier 78. The signal is then sent to a gate 36 which performs the range gate operations described earlier in this detailed description. The signal is then sent to a second IF strip 42. The IF strip 42 has a mixer 82 to convert the signal to a second intermediate frequency. The signal is amplified by a second amplifier 86 and sent to a narrow band filter 90 which performs pulse to pulse integration. The signal is then sent to an I/Q mixer 46 which converts the return to baseband frequency and provides in-phase and quadrature phase outputs to the digitizer for positive and negative Doppler frequency determination. I/Q mixers are well known in this area of technology and a more detailed description of its operation will not be discussed. Once the return from the I/Q mixer 46 is digitized by a digitizer 46, the Doppler filter 94 of the processor 48 is set to pass only the desired Doppler swath as determined from the vertical velocity provided by the vehicle's internal navigation system. As stated previously, the vertical velocity has been assumed to be zero for the ease of description. However, the vertical velocity is rarely zero and the value of the vertical velocity would be utilized at this point of the present invention in determining the desired swath. The phase comparitor 96 then determines the phase difference between the range received from the return signals of the two receivers and the position processor 98 determines the altitude of the aircraft 2, the height of the highest object and the crosstrack location.

It should be recognized that many components in the present invention can be interchanged with other components with similar operations. Further, the present invention may incorporate addition or deletion of some components as long as the spirit of the invention is maintained. The present invention is not limited to the embodiment as shown in FIGS. 5 and 6, but rather FIGS. 5 and 6 are shown as examples of the present invention.

The invention has been described herein in detail in order to comply with the Patent Statutes and to provide those skilled in the art with the information needed to apply the novel principles and to construct and use such specialized components as are required. However, it is to be understood that the invention can be carried out by specifically different components, and that various modifications can be accomplished without departing from the scope of the invention itself.

The embodiments of the invention in which an exclusive property or right is claimed are defined as follows:

1. System located on an aircraft for determining the position of the aircraft, comprising:
    transmitter located on the aircraft transmitting a transmit signal to terrain below the aircraft which will be reflected;
    first receiver located on the aircraft receiving a first reflected signal reflected back to the aircraft upon contact with terrain in a first area wherein the first area is terrain ahead of the aircraft;
    second receiver located on the aircraft receiving a second reflected signal reflected back to the aircraft upon contact with terrain in a second area wherein the second area is the terrain the aircraft is currently over wherein the first and second receivers are separated by a separation distance; and
    apparatus, located on the aircraft for determining position of the aircraft based on information received from the signal reflected back to the aircraft wherein the apparatus for determining first determines an approximate range to a highest point in the first area and an accurate range to a highest point in the second area.

2. The system of claim 1 wherein the approximate range is stored in a memory.

3. The system of claim 2 wherein the accurate range is determined by using the approximate range stored in memory to perform a range analysis to determine the accurate range.

4. The system of claim 3 wherein the first receiver and the second receiver receive a signal transmitted, by the transmitter, to the highest point in the second area to determine a first range and a second range and calculate the position of the aircraft to the highest point based on the difference between the first range and the second range, and the separation distance.

5. The system of claim 1 wherein the determining apparatus determines the altitude of the aircraft from the information received from the signal reflected back to the aircraft.

6. The system of claim 1 wherein the apparatus for determining compares the position of the aircraft, in regards to the highest points, to a map and determines a map position of the aircraft.

7. The system of claim 1 wherein both receivers further comprise:
    an antenna;
    a range gate;
    a Doppler filter; and
    a tracker.

8. The system of claim 1 wherein the apparatus for determining further comprises:
    a phase comparitor; and
    a position processor.

9. System, located on the aircraft for determining the position of an aircraft, comprising:
    transmitter located on the aircraft transmitting a signal to terrain below the aircraft;
    receiver located on the aircraft determining a highest point in the terrain below and receiving a plurality of signals reflected back to the aircraft from the highest point; and
    an apparatus located on the aircraft comparing information received from the signals reflected back to the aircraft and processing the information to determine the position of the aircraft.

10. The system of claim 9 wherein the comparing apparatus determines the altitude of the aircraft from the information received from the signal reflected back to the aircraft.

11. The system of claim 9 wherein the apparatus for determining compares the position of the aircraft, in regards to the highest points, to a map and determines a map position of the aircraft.

12. The system of claim 9 wherein the apparatus for comparing further comprises:
    a phase comparitor; and
    a position processor.

13. The system of claim 9 wherein the receiver further comprises
    a first antenna;
    a second antenna;
    a range gate;
    a Doppler filter; and
    a tracker.

14. The system of claim 13 wherein the signals received represent a first range received by the first antenna and a second range received by the second antenna and the comparing apparatus calculates the position of the aircraft to the highest point based on the difference between the first range and the second range and distance between the first antenna and the second antenna.

* * * * *